US010906625B2

(12) United States Patent
Heeren

(10) Patent No.: US 10,906,625 B2
(45) Date of Patent: Feb. 2, 2021

(54) AIRCRAFT DOOR HINGE ASSEMBLY

(71) Applicant: Airbus Operations GmbH, Hamburg (DE)

(72) Inventor: Jens Heeren, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 349 days.

(21) Appl. No.: 15/938,063

(22) Filed: Mar. 28, 2018

(65) Prior Publication Data

US 2018/0281920 A1 Oct. 4, 2018

(30) Foreign Application Priority Data

Mar. 31, 2017 (DE) .................. 10 2017 107 016

(51) Int. Cl.
*B64C 1/14* (2006.01)
*E05D 11/00* (2006.01)

(52) U.S. Cl.
CPC .......... *B64C 1/1461* (2013.01); *B64C 1/1415* (2013.01); *E05D 11/0054* (2013.01); *E05D 2011/0072* (2013.01); *E05Y 2201/11* (2013.01); *E05Y 2800/402* (2013.01); *E05Y 2800/404* (2013.01); *E05Y 2800/674* (2013.01); *E05Y 2900/502* (2013.01); *E05Y 2900/531* (2013.01)

(58) Field of Classification Search
CPC . B64C 1/1415; B64C 1/1461; E05D 11/0054; E05D 2011/0072; E05Y 2201/11; E05Y 2800/402; E05Y 2800/404; E05Y 2800/674; E05Y 2900/502
USPC ....................................................... 244/129.5
See application file for complete search history.

(56) References Cited

U.S. PATENT DOCUMENTS

| 3,051,280 A | * | 8/1962 | Wood | .................... B64C 1/1407 |
| | | | | 49/249 |
| 4,634,172 A | | 1/1987 | Duda | |
| 4,720,065 A | * | 1/1988 | Hamatani | ............ B64C 1/1407 |
| | | | | 244/129.5 |
| 5,282,338 A | | 2/1994 | Oliver | |
| 5,509,235 A | * | 4/1996 | Chander | ............... E05C 17/025 |
| | | | | 160/40 |
| 6,276,026 B1 | | 8/2001 | Wille | |

(Continued)

FOREIGN PATENT DOCUMENTS

| DE | 69102043 | 9/1994 |
| GB | 707881 | 4/1954 |
| JP | 2000 168 630 | 6/2000 |

OTHER PUBLICATIONS

German Search Report, dated Sep. 18, 2017, priority document.

*Primary Examiner* — Claude J Brown
(74) *Attorney, Agent, or Firm* — Greer, Burns & Crain, Ltd.

(57) ABSTRACT

An aircraft door hinge assembly, comprising a door with an outer skin and a frame provided with at least one lug; a fuselage frame provided with at least one clevis configured to be pivotally attached to the lug with a hinge pin so that the door is pivotable relative to the fuselage door frame about a hinge line; a rotatable filler pivotally mounted, at a proximal end, within a gap provided by the clevis; and, a fixed filler having a proximal end fixedly attached to an outermost surface of the lug adjacent to the hinge line, and having a distal end configured to overlap the distal end of the rotatable filler, such that the fixed filler limits rotation of the rotatable filler.

13 Claims, 4 Drawing Sheets

(56) References Cited

U.S. PATENT DOCUMENTS

| | | |
|---|---|---|
| 7,198,062 B2 | 4/2007 | Hoffman et al. |
| 2010/0000991 A1* | 1/2010 | Henry ........................ B64C 3/56 |
| | | 219/679 |
| 2010/0288887 A1* | 11/2010 | Parker ........................ B64C 9/02 |
| | | 244/213 |
| 2016/0327993 A1* | 11/2016 | Garelli ................... G06F 1/1637 |

* cited by examiner

AIRCRAFT DOOR HINGE ASSEMBLY

CROSS-REFERENCES TO RELATED APPLICATIONS

This application claims the benefit of the German patent application No. 10 2017 107 016.8 filed on Mar. 31, 2017, the entire disclosures of which are incorporated herein by way of reference.

FIELD OF TECHNOLOGY

The present technology relates to an aircraft door hinge assembly.

BACKGROUND OF THE INVENTION

Aircraft doors for commercial aircraft typically comprise one or more hinge assemblies that attach the door to the main fuselage of the aircraft and allow the door to be rotated about a hinge axis between an open position for loading on the ground and a closed position during flight.

A hinge assembly normally comprises one or more pins held within a lug and a corresponding clevis, each provided by underlying frame structures of the door and fuselage. The outer skin of the door and the fuselage are then normally arranged on top of the frames (i.e., the outermost structure of the fuselage). This type of arrangement sometimes requires a cut out to be made for each lug position in the skin of the door to accommodate the lug, which would otherwise be obstructed by the overlying skin of the door as the door hinge assembly is extended between fully open and fully closed positions. The cutouts form cavities in the surface of the aircraft. This may be desirable as the cutout provides a useful means for carrying out routine inspections on the ground of the hinge assembly. The cutouts do, however, expose the hinge assembly to the external environment. During flight the cavities can be the source of unwanted vibration and aeroacoustic noise due to Helmholtz resonance interaction of the cavity with the surrounding airflow. The boundary layer of the airflow may also breakdown in the region of airflow surrounding the cavity, resulting in drag, which is not desirable as it increase fuel consumption and reduces the range of the aircraft.

Furthermore, the exposure of the hinge assembly due to the cutout to the external environment may cause the loss of lubrication from the hinge assembly. During flight, lubricants used to lubricate the hinge assembly can be blown downstream of the cavity along the outer surface of the aircraft, resulting in undesirable blemishes that require frequent removal.

In view of the above it can be considered an object of the present technology to provide an improved aircraft door hinge assembly.

SUMMARY OF THE INVENTION

An embodiment of the present technology provides an aircraft door hinge assembly, comprising a door with an outer skin and a frame provided with at least one lug; a fuselage frame provided with at least one clevis that is configured to be pivotally attached to the lug with a hinge pin so that the door is pivotable relative to the fuselage door frame about a hinge line; a rotatable filler that is pivotally mounted, at a proximal end, within a gap provided by the clevis; and, a fixed filler having a proximal end fixedly attached to an outermost surface of the lug adjacent to the hinge line, and having a distal end that is configured to overlap the distal end of the rotatable filler such that the fixed filler limits rotation of the rotatable filler.

A further embodiment of the present technology provides an aircraft door hinge assembly wherein the hinge line of the door is orientated in a substantially stream-wise direction.

Another embodiment of the present technology provides an aircraft door hinge assembly wherein the rotatable filler is configured to substantially cover a portion of the cavity that is not occupied by the lug.

Yet another embodiment of the present technology provides an aircraft door hinge assembly wherein the fixed filler is configured to substantially cover a portion of the cavity that is occupied by the lug.

A further embodiment of the present technology provides an aircraft door hinge assembly wherein a distal end of the rotatable filler is substantially curved towards the hinge line.

Another embodiment of the present technology provides an aircraft door hinge assembly wherein a gap of at least 2 mm is provided between the edges of the fillers and their adjacent structures.

A further embodiment of the present technology provides an aircraft door hinge assembly wherein the fixed filler is integrally formed with the door skin or the door frame.

Another embodiment of the present technology provides an aircraft door hinge assembly wherein the rotatable filler is rotatably mounted on a pin shaft which spans a gap provided by the clevis and is supported within a pair of concentric holes each formed within an arm of the clevis.

A further embodiment of the present technology provides an aircraft door hinge assembly wherein the rotatable filler is rotatably mounted on a pin shaft which spans a gap provided by the clevis and is integrally formed with the body of the clevis.

Another embodiment of the present technology provides an aircraft door assembly wherein a proximal end of the rotatable filler comprises a clasp configured to retain the rotatable filler on the pin shaft in a way that the rotatable filler may be removed without requiring removal of the pin shaft.

A further embodiment of the present technology provides an aircraft door hinge assembly wherein hinge assembly is further provided with biasing means configured to bias the rotatable filler against the overlapping fixed filler.

Another embodiment of the present technology provides an aircraft door hinge assembly wherein the biasing means is provided by a torsion spring retained on the pin shaft.

A further embodiment of the present technology provides an aircraft door hinge assembly wherein the door is a cargo door of an aircraft.

Advantages of the present technology will now become apparent from the detailed description with appropriate reference to the accompanying drawings.

BRIEF DESCRIPTION OF THE DRAWINGS

Embodiments of the technology will now be described, by way of example only, with reference to the following drawings in which.

DETAILED DESCRIPTION OF THE PREFERRED EMBODIMENTS

Figure 1:
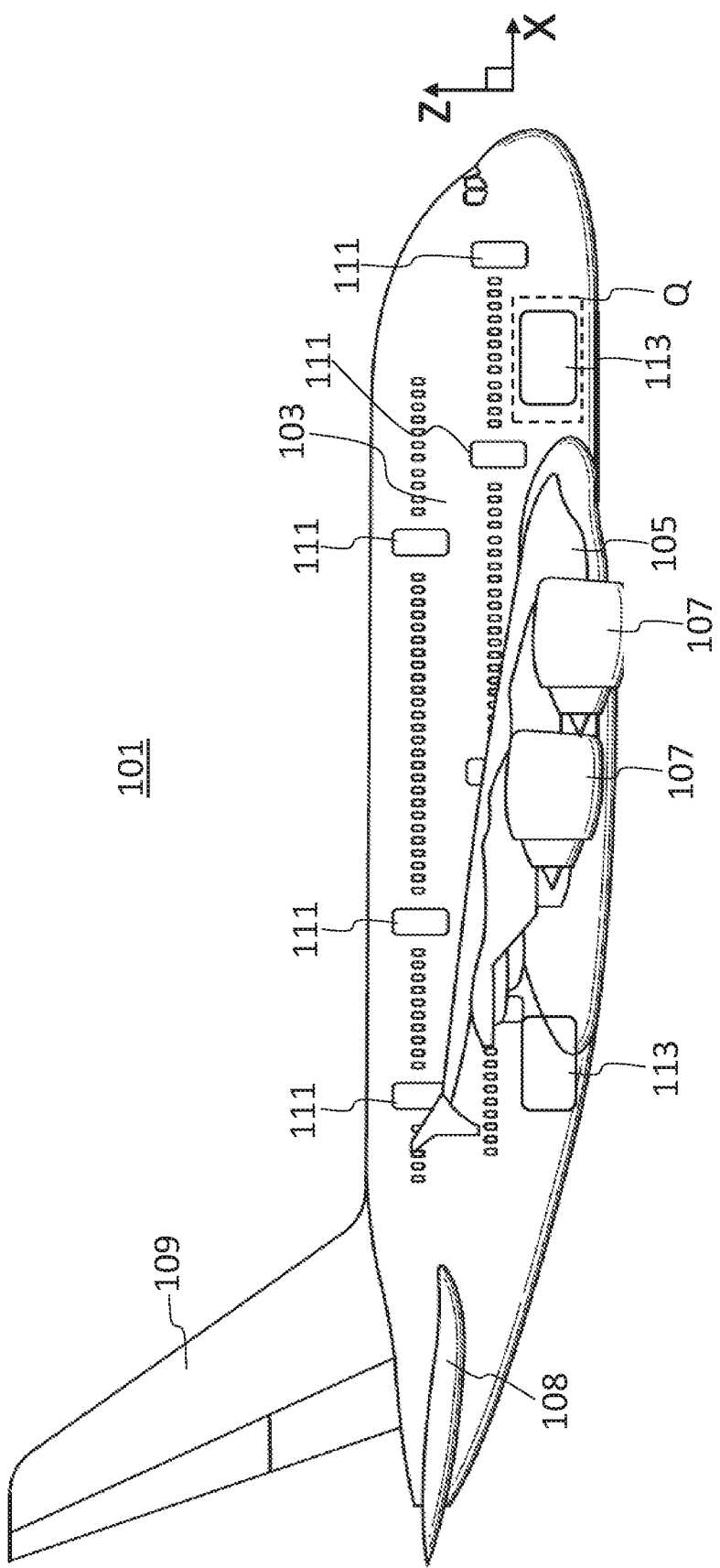
FIG. 1 is a side view of an aircraft according to the prior art in which the prior art door of FIG. 2 can be used, and also in which the door according to an embodiment of the present technology of FIGS. 3 and 4A-4C can be used.

With reference to FIG. 1, an aircraft 101 comprises a pair of lifting surface assemblies in the form of wings 105 that join into a fuselage 103. Each wing 105 carries an engine 107. The aircraft 101 comprises further lifting surface assemblies in the form a horizontal tail plane 108 and a vertical tail plane 109, each attached at the rear of the fuselage 103.

The aircraft 101 comprises set of passenger doors 111 on each side of the aircraft which open and close to provide access to the passenger deck(s) of the aircraft 101. The passenger doors 111 are pivotally hinged about an axis that is substantially vertical, in other words substantially parallel to the aircraft vertical axis Z.

The aircraft 101 further comprises a pair of cargo doors 113 on one or both sides of the aircraft. The cargo doors 113 open and close to provide access to the cargo deck of the aircraft 101. The cargo doors 113 are pivotally hinged along their upper edge about an axis that is substantially streamwise, in other words, substantially parallel to the aircraft longitudinal axis X, as indicated. Not shown is the aircraft spanwise axis Y, which extends positively from the page of FIG. 1. The X Y and Z aircraft axes are orthogonal to one another and share the same origin.

Figure 2:
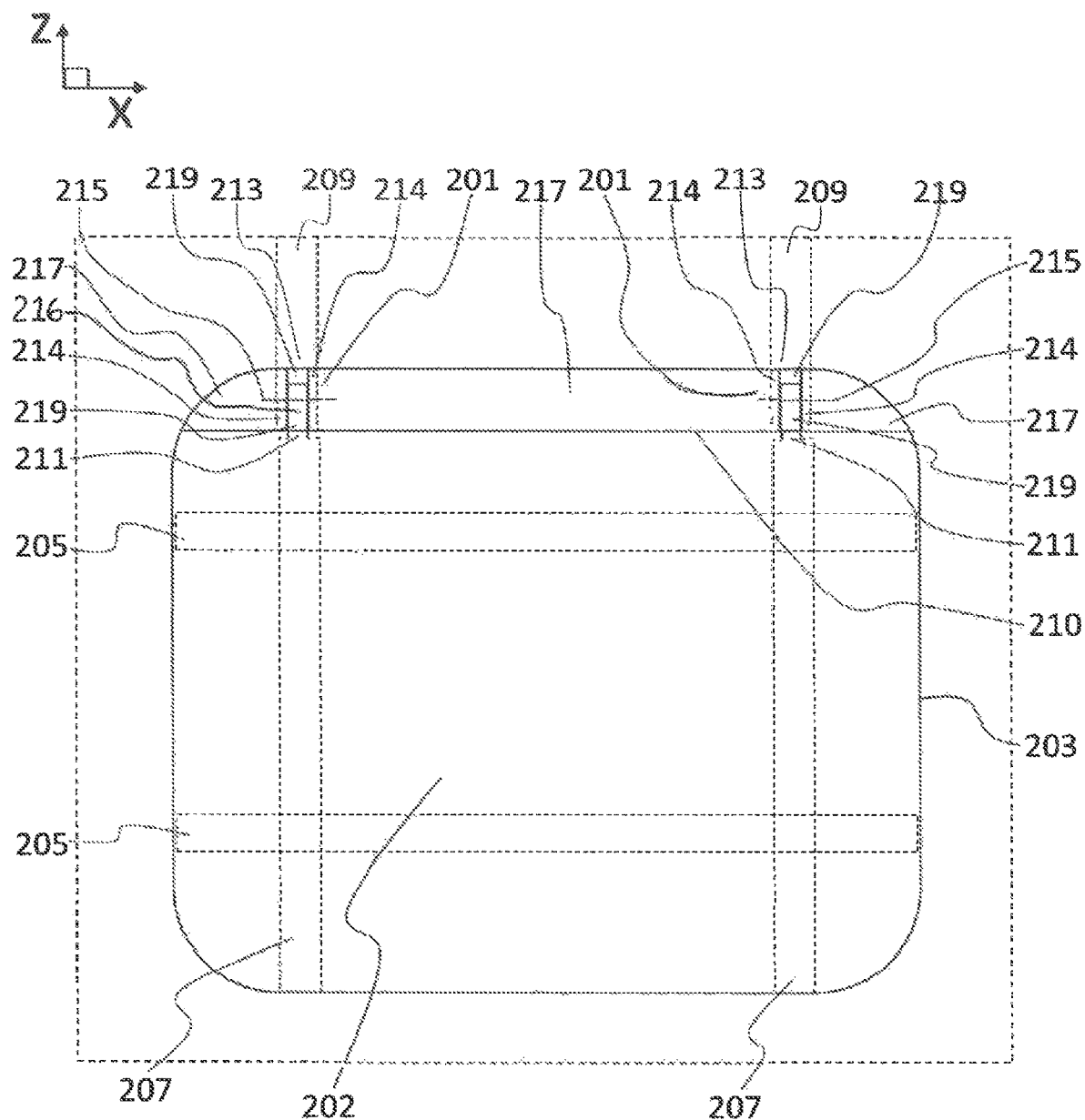
FIG. 2 shows detail Q of FIG. 1, which is a side view of a cargo door assembly according to the prior art.

With reference to FIG. 2, the cargo door 113 comprises a pair of identical hinge assemblies 201. The cargo door 113 has an outer skin 202 that is bounded by an aperture 203 on its lower streamwise and vertical sides. The outer skin 202 is fixedly attached by rivets to an underlying frame subassembly provided by a pair of horizontal frames 205 fixed to a pair of vertical frames 207. The uppermost end of each vertical frame 207 forms a lug 211 with a straight bore 212 (FIG. 4). The skin 202 does not extend over each lug 211 and stops at an interface edge 210.

A set of fuselage frames 209 are also provided to provide an attachment point for the door 113 and to carry the fuselage skin. The fuselage frames 209 are aligned vertically with the cargo door frames 207. The lowermost end of each fuselage frame 209 forms a clevis 213 with a pair of arms 214, each is provided with a set of concentric straight bores. The clevis 213 is configured to receive the corresponding lug 211 in a gap 216 between the two arms 214 of each clevis. A hinge pin 215 pivotally attaches the lug 211 to the clevis 213 so that the door 103 is pivotable relative to the fuselage frame 209 about a hinge line defined by the hinge pin 215.

Additional, smaller, outer skin panels 217 are attached to the outermost surfaces of each clevis 213. The outer skin panels 217 form a continuation of the skin 202 from the interface edge 210 to the uppermost streamwise edge of the aperture 203. A cutout is formed over the lug 211 at each hinge assembly 201 position due to the skin 202 and outer skin panels 217 not meeting. This cutout forms a cavity 219 that is bounded by the edges of the skin 202 and outer skin panels 217 within the aperture 203, which exposes the hinge assembly 201 as already mentioned.

Figure 3:
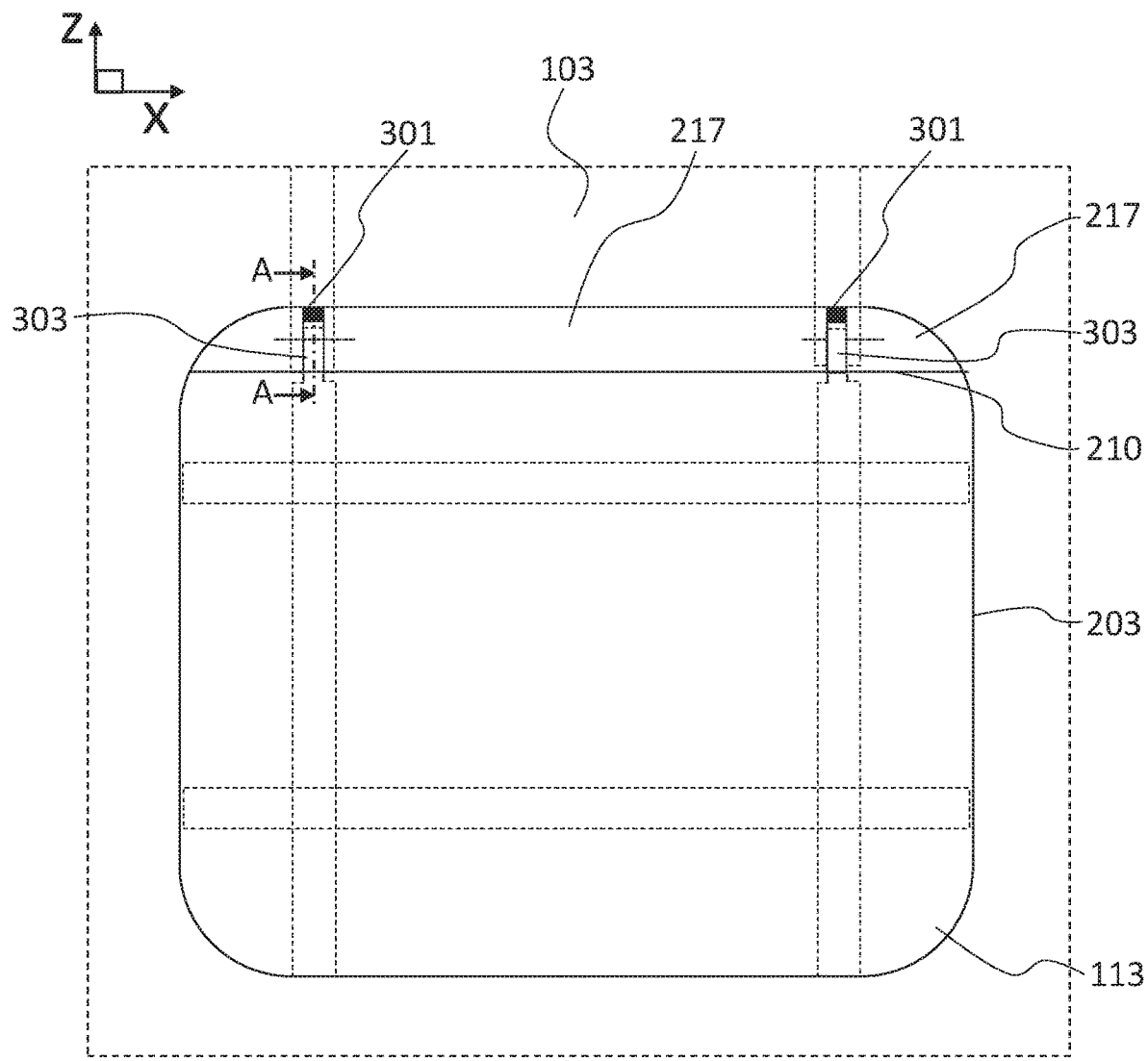
FIG. 3 is a side view of a door assembly of the FIG. 1 aircraft, according to an embodiment of the present technology.

With reference to FIG. 3, hinge assemblies 201 of FIGS. 1 and 2 are provided according to the present technology to the cargo door. It should be appreciated by the skilled person that the hinge assembly according to the present technology may in similar conditions be suitable for use other types of aircraft doors such as passenger doors 111, access panels etc.

A rotatable filler 301 is provided within a region of the gap 219 that is in proximity to the hinge line but not occupied by the lug 211. The body of the rotatable filler 301 extends vertically and streamwise within the gap 219 and has a thickness of approximately 3 mm Preferably it has vertical length and streamwise width to cover a portion of the cavity 219 not occupied by the lug 211. The body is substantially formed from a stiff material, such as aviation grades of aluminum alloy, e.g., T700 series alloy, or reinforced composite fiber material, e.g., GFRP. The rotatable filler 301 is mounted pivotally (further description with FIGS. 4A to 4C) such that it can rotate in the Y spanwise direction.

Preferably the outermost surface of the rotatable filler 301 is substantially co-planar with the outermost surface of the fuselage 103, the door skin 202 and the outer skin panel 217, such that it does not form an unwanted streamwise aerodynamic step at its leading vertical edge, which would otherwise lead to increasing drag during flight.

Positioned vertically below and in proximity to each rotatable filler 301 is a fixed filler 303. The fixed filler 303 is made from a similar material, also extends vertically and streamwise within the gap 219 and has a thickness of approximately 3 mm. Alternatively, the fixed filler is integrally formed with the door skin or the door frame, which permits easier manufacture and assembly. Preferably the fixed filler 303 has a vertical length and streamwise width to cover a portion of the cavity 219 occupied by the lug 211. The outermost surface of the fixed filler 303 is preferably also substantially co-planar with the outermost surface of the fuselage 103, the door skin 202 and the outer skin panel 217, such that it does not form an unwanted streamwise aerodynamic step at its leading vertical edge.

The rotatable filler 301 and the fixed filler 303, function together to substantially cover the cavity 219 during normal operation of the aircraft, while not obstructing the hinge assembly 201 when the door 113 is rotated between a fully closed position to a fully open position, or vice versa. This ensures that the overall hinge assembly 201 is not exposed to the environment during flight, therefore reducing migration of lubricants, and/or reducing drag and/or reducing aeroacoustic noise, and on the ground, where exposure may result in degradation of the hinge assembly due to foreign objects such as dust and contaminants such as oil and corrosive substances. At the same time, the rotatable filler 301 also ensures that the hinge assembly 201 can be inspected from the outside of the aircraft 101 while it is on the ground without significant disassembly of the door 113 or access to the aircraft 101 being required.

Preferably a gap of no greater than 2 mm is provided between the edges of the fillers 301 303 and their adjacent structures. This gap ensures that there is no fouling of the hinge assembly 201 when the door 113 is opened and closed.

Figure 4A:
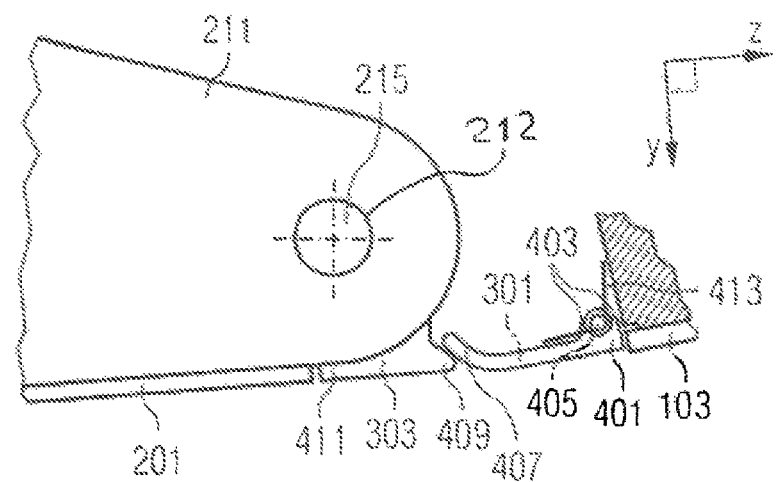
FIG. 4A is a section view of the door assembly of FIG. 3 in a fully closed position through section line A-A of FIG. 3

With reference to FIG. 4A, details of the hinge assembly 201 and fillers 301, 303 can be seen where the cargo door 113 is in a closed position. A proximal (in other words vertical uppermost) end 401 of the rotatable filler 301 forms a biased clasp 403 that rotatably attaches the rotatable filler 301 to a pin shaft 405. Alternatively, the proximal end 401 may form a through-hole configured to receive the pin shaft 405 and retain the rotatable filler 301. Alternatively, the function of the pin shaft 405 to support the rotatable filler 301 may be provided by any other appreciated by the skilled person, e.g. The rotatable filler 301 may be mounted on spherical spigot.

The clasp 403 extends around a majority of the outer circumference of the pin shaft 405 such that it is retained on the pin shaft 405, but can also be detached from the shaft 405 by bending the clasp 403 a predetermined amount. This is advantageous as the rotatable filler 301 can be replaced quickly without removal of the pin shaft 405. The predetermined amount described should not be lower than the normal bending loads experienced by the rotatable filler 301 during operation of the aircraft 101 otherwise it will detach during flight. The pin shaft 405 extends across the gap 216 between the two arms 214 of each clevis and is supported in a hole provided on each arm 214.

The pin shaft 405 is substantially circular in cross section. It may alternatively be integrally formed with structure of the clevis 213, which reduces the number of parts in the assembly. The pin shaft 405 has substantially the same orientation as the hinge line of the assembly 201 such that the rotatable filler 301 rotates in the same sense as the door 113.

The body of the rotatable filler 301 extends vertically downwards from its proximal end 401 to its distal end 407 which contacts a corresponding distal end 409 of the fixed filler 303. The fixed filler 303 has a proximal end 411 that is fixedly attached to an outermost surface of the lug 211 adjacent to the hinge line. The distal end 409 of the fixed filler 303 is configured to overlap the distal end 407 of the rotatable filler 301 adjacent to it, at least when the door 113 is in the closed position. The distal end 407 of the rotatable filler 301 is substantially curved towards the hinge line.

A function of the fixed filler 303 is also therefore to limit rotation of the rotatable filler 301. This prevents the rotatable filler 301 from extending substantially out of the plane of the outer skin 202 and outer skin panel 217 as a result of aerodynamic or inertial loads. Otherwise this could result in the rotatable filler 301 presenting a streamwise edge to the oncoming streamwise airflow when the aircraft is in flight, which would cause drag, noise and/or expose the cavity 219 to the external environment.

Preferably, biasing means 413 in the form of a torsion spring is provided for the rotatable filler 301. A torsion spring as a biasing means 413 can be retained easier on the pin shaft 405, but in any event, it is configured to bias the rotatable filler 301 against the fixed filler 303 in order to overcome any higher than normal, short period, aerodynamic or inertial loading of the rotatable filler 303 during flight. A further advantage is that it ensures that the rotatable filler 301 always returns to the closed position when the rotatable filler 301 is pushed inwards while the aircraft is inspected on the ground, as previously described. It should be appreciated by the skilled person that other variants of biasing means may be used, for example other types of coiled springs, rubber mounts, etc.

Figure 4B:
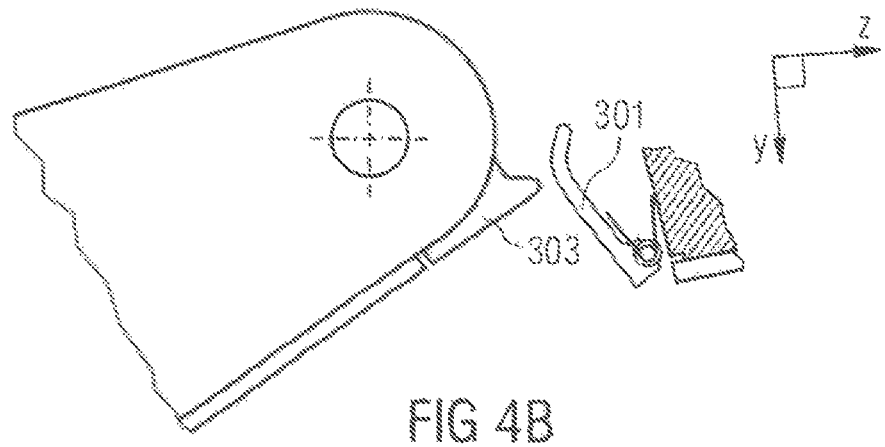
FIG. 4B is a section view of the door assembly of FIG. 3 in an intermediate position through section line A-A of FIG. 3

With reference to FIG. 4B, further details of the hinge assembly 201 and fillers 301, 303 can be seen where the cargo door 113 is in an intermediate position between fully open and fully closed. Preferably the distal end 407 of the rotatable filler 301 is substantially curved inwards towards the hinge line. This ensures that the rotatable filler 301 does not obstruct the path of movement of the overlapping fixed filler 303, as the door is transitioned between fully open and closed positions.

Figure 4C:
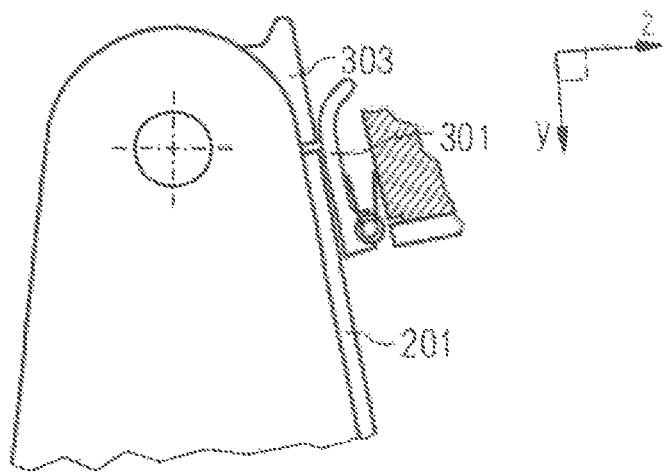
FIG. 4C is a section view of the door assembly of FIG. 3 in a fully open position through section line A-A of FIG. 3

With reference to FIG. 4C, further details of the hinge assembly 201 and fillers 301, 303 can be seen where the cargo door 113 is in a fully open position. Preferably the outer surface of the rotatable filler 301 is substantially flat in a region surrounding the proximal end 401. This ensures that the rotatable filler 301 lies flat against the door skin 202 and fixed filler 303 when the door 113 is in the fully open position.

Where in the foregoing description, integers or elements are mentioned which have known, obvious or foreseeable equivalents; then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft door hinge assembly, comprising
    a door with an outer skin and a frame provided with at least one lug;
    a fuselage frame provided with at least one clevis configured to be pivotally attached to the lug with a hinge pin so that the door is pivotable relative to the fuselage door frame about a hinge line;
    a rotatable filler pivotally mounted, at a proximal end, within a gap provided by the clevis; and
    a fixed filler having a proximal end fixedly attached to an outermost surface of the lug adjacent to the hinge line, and having a distal end that is configured to overlap the distal end of the rotatable filler such that the fixed filler limits rotation of the rotatable filler.

2. An aircraft door hinge assembly according to claim 1, wherein the hinge line of the door is orientated in a substantially stream-wise direction.

3. An aircraft door hinge assembly according to claim 1, wherein the rotatable filler is configured to substantially cover a portion of the cavity that is not occupied by the lug.

4. An aircraft door hinge assembly according to claim 1, wherein the fixed filler is configured to substantially cover a portion of the cavity occupied by the lug.

5. An aircraft door hinge assembly according to claim 1, wherein a distal end of the rotatable filler is substantially curved towards the hinge line.

6. An aircraft door hinge assembly according to claim 1, wherein a gap of at least 2 mm is provided between edges of the fillers and their adjacent structures.

7. An aircraft door hinge assembly according to claim 1, wherein the fixed filler is integrally formed with the door skin or the door frame.

8. An aircraft door hinge assembly according to claim 1, wherein the rotatable filler is rotatably mounted on a pin shaft which spans a gap provided by the clevis and is supported within a pair of concentric holes each formed within an arm of the clevis.

9. An aircraft door hinge assembly according to claim 1, wherein the rotatable filler is rotatably mounted on a pin shaft which spans a gap provided by the clevis and is integrally formed with the body of the clevis.

10. An aircraft door assembly according to claim 1, wherein a proximal end of the rotatable filler comprises a clasp configured to retain the rotatable filler on the pin shaft in a way that the rotatable filler may be removed without requiring removal of the pin shaft.

11. An aircraft door hinge assembly according to claim 1, wherein the hinge assembly is further provided with a biasing means configured to bias the rotatable filler against the overlapping fixed filler.

12. An aircraft door hinge assembly according to claim 11, wherein the biasing means is provided by a torsion spring retained on the pin shaft.

13. An aircraft door hinge assembly according to claim 1, wherein the door is a cargo door of an aircraft.

\* \* \* \* \*